(12) United States Patent
Morishima

(10) Patent No.: US 12,416,769 B2
(45) Date of Patent: Sep. 16, 2025

(54) OPTICAL FIBER CONNECTION COMPONENT AND METHOD FOR MANUFACTURING OPTICAL FIBER CONNECTION COMPONENT

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 456 days.

(21) Appl. No.: 17/911,520

(22) PCT Filed: Mar. 5, 2021

(86) PCT No.: PCT/JP2021/008825
§ 371 (c)(1),
(2) Date: Sep. 14, 2022

(87) PCT Pub. No.: WO2021/187178
PCT Pub. Date: Sep. 23, 2021

(65) Prior Publication Data
US 2023/0236367 A1    Jul. 27, 2023

(30) Foreign Application Priority Data
Mar. 16, 2020    (JP) .............. 2020-045286

(51) Int. Cl.
*G02B 6/38*    (2006.01)

(52) U.S. Cl.
CPC ........ *G02B 6/3885* (2013.01); *G02B 6/3825* (2013.01); *G02B 6/3897* (2013.01)

(58) Field of Classification Search
CPC ... G02B 6/3885; G02B 6/3825; G02B 6/3897
USPC ......................................... 385/78
See application file for complete search history.

(56) References Cited

U.S. PATENT DOCUMENTS

| | | | |
|---|---|---|---|
| 4,325,604 A * | 4/1982 | Witte .................. | G02B 6/2804 385/48 |
| 4,818,059 A | 4/1989 | Kakii et al. | |
| 4,952,263 A | 8/1990 | Kakii et al. | |
| 2015/0063755 A1 | 3/2015 | Doany et al. | |
| 2015/0192745 A1* | 7/2015 | Yamazaki ........... | G02B 6/4249 385/83 |

(Continued)

FOREIGN PATENT DOCUMENTS

| | | |
|---|---|---|
| CN | 87 1 01894 A | 10/1987 |
| JP | H11-174274 A | 7/1999 |

(Continued)

*Primary Examiner* — Jerry M Blevins
(74) *Attorney, Agent, or Firm* — Oliff PLC

(57) ABSTRACT

A method for manufacturing an optical fiber connecter includes preparing optical fiber including a glass fiber and a resin coating portion covering the glass fiber, mounting the optical fiber on a first optical fiber holder, adjusting an azimuth around a central axis for the optical fiber, bonding the glass fiber to the first optical fiber holder, mounting the glass fiber on a second optical fiber holder, bonding the glass fiber to the second optical fiber holder, and grinding end faces of the glass fiber and an the second optical fiber holder so that the end face of the glass fiber is flush with the end face of the second optical fiber holder.

16 Claims, 16 Drawing Sheets

(56) References Cited

U.S. PATENT DOCUMENTS

| | | | |
|---|---|---|---|
| 2016/0252683 | A1 | 9/2016 | Sasaki et al. |
| 2018/0314012 | A1* | 11/2018 | Gsell .................... G02B 6/3858 |
| 2019/0101705 | A1* | 4/2019 | Morishima ............ G02B 6/387 |
| 2019/0170931 | A1 | 6/2019 | Sakamoto et al. |
| 2019/0331865 | A1 | 10/2019 | Morishima |
| 2021/0041633 | A1 | 2/2021 | Morishima |
| 2021/0271034 | A1 | 9/2021 | Morishima |

FOREIGN PATENT DOCUMENTS

| | | |
|---|---|---|
| JP | 2015-125172 A | 7/2015 |
| WO | 2018/008399 A1 | 1/2018 |
| WO | 2018/135368 A1 | 7/2018 |
| WO | 2020/145010 A1 | 7/2020 |

* cited by examiner

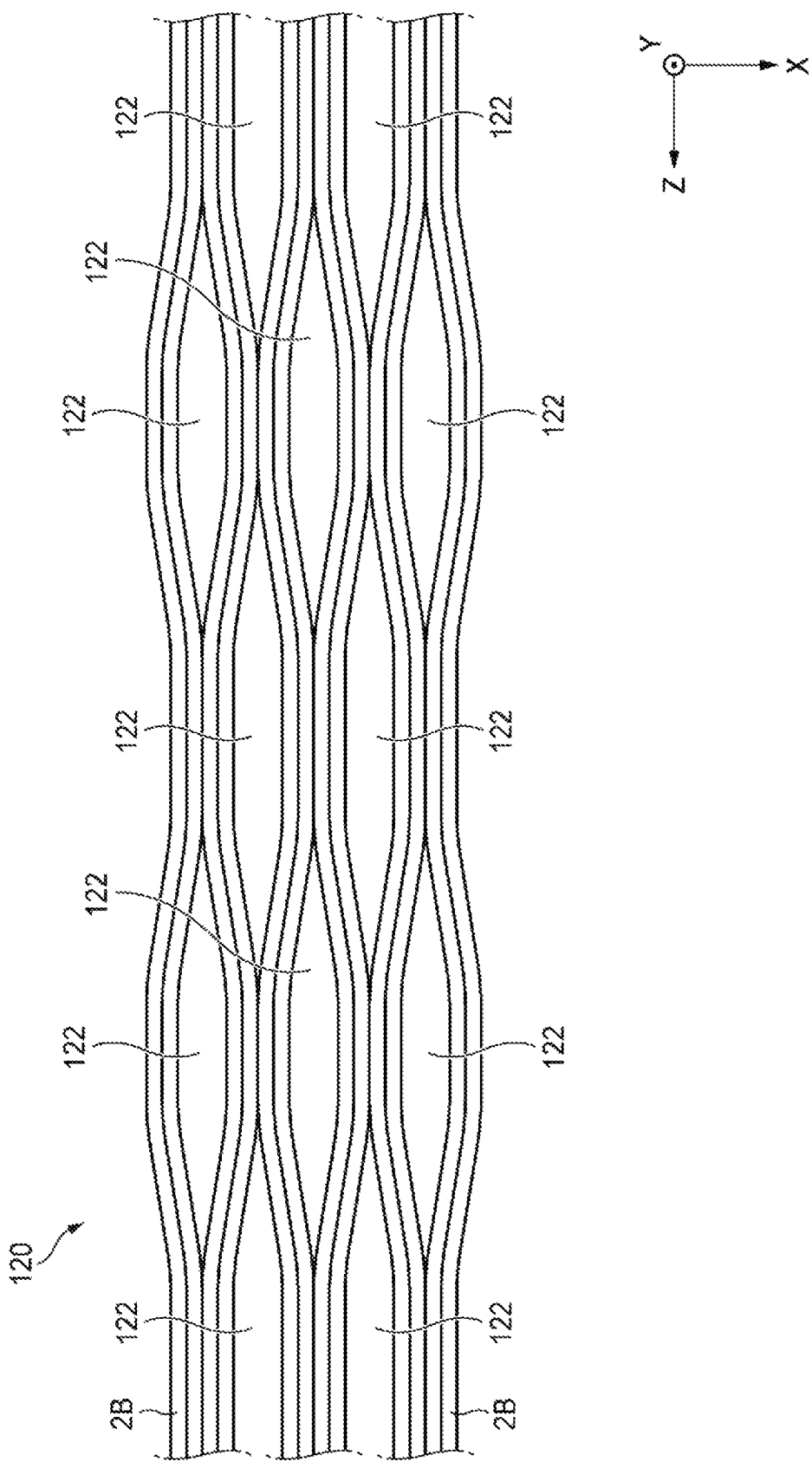

OPTICAL FIBER CONNECTION COMPONENT AND METHOD FOR MANUFACTURING OPTICAL FIBER CONNECTION COMPONENT

TECHNICAL FIELD

The present disclosure relates to an optical fiber connection component and a method of manufacturing the optical fiber connection component.

The present application claims priority from Japanese Patent Application No. 2020-045286 filed on Mar. 16, 2020, contents of which are incorporated by reference in its entirety.

BACKGROUND ART

Patent Literature 1 discloses a method for manufacturing an optical connector including a multi-core fiber. According to the manufacturing method disclosed in Patent Literature 1, after the multi-core fiber is arranged in a V groove provided in a connector ferrule, an azimuth around a central axis of the multi-core fiber is adjusted (that is, the multi-core fiber is performed to rotational alignment).

CITATION LIST

Patent Literature

Patent Literature: JP-A-2015-125172

SUMMARY OF INVENTION

Solution to Problem

A method for manufacturing an optical fiber connection component according to an aspect of the present disclosure includes: a step of preparing one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis; a first mounting step of mounting the one or the plurality of optical fibers on a first optical fiber holding member so that one or a plurality of glass fibers exposed from the resin coating portion are arranged side by side in a first direction and protrude to an outside from the first optical fiber holding member; a rotational alignment step of adjusting an azimuth around a central axis for the one or the plurality of optical fibers; a first bonding step of bonding the one or the plurality of glass fibers to the first optical fiber holding member using a first bonding agent; a second mounting step of mounting the one or the plurality of glass fibers on a second optical fiber holding member so that one or a plurality of glass fibers protruding to the outside from the first optical fiber holding member are arranged side by side in the first direction; a second bonding step of bonding the one or the plurality of glass fibers to the second optical fiber holding member using a second bonding agent; and a step of grinding an end face of the one or the plurality of glass fibers and an end face of the second optical fiber holding member so that the end face of the one or the plurality of glass fibers is flush with the end face of the second optical fiber holding member.

An optical fiber connection component according to an aspect of the present disclosure includes: one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis; a first optical fiber holding member holding the one or the plurality of glass fibers so that one or a plurality of glass fibers exposed from the resin coating portion are arranged side by side in a first direction and protrude to an outside from the first optical fiber holding member; and a second optical fiber holding member holding the one or the plurality of glass fibers so that the one or the plurality of glass fibers protruding from the first optical fiber holding member are arranged side by side in the first direction. An end face of the second optical fiber holding member is flush with an end face of the one or the plurality of glass fibers. An end face of the second optical fiber holding member is flush with an end face of the one or the plurality of glass fibers.

BRIEF DESCRIPTION OF DRAWINGS

FIG. 15 is a diagram illustrating an example of an intermittent bonded-type fiber ribbon.

DESCRIPTION OF EMBODIMENTS

Technical Problem

Figure 1:
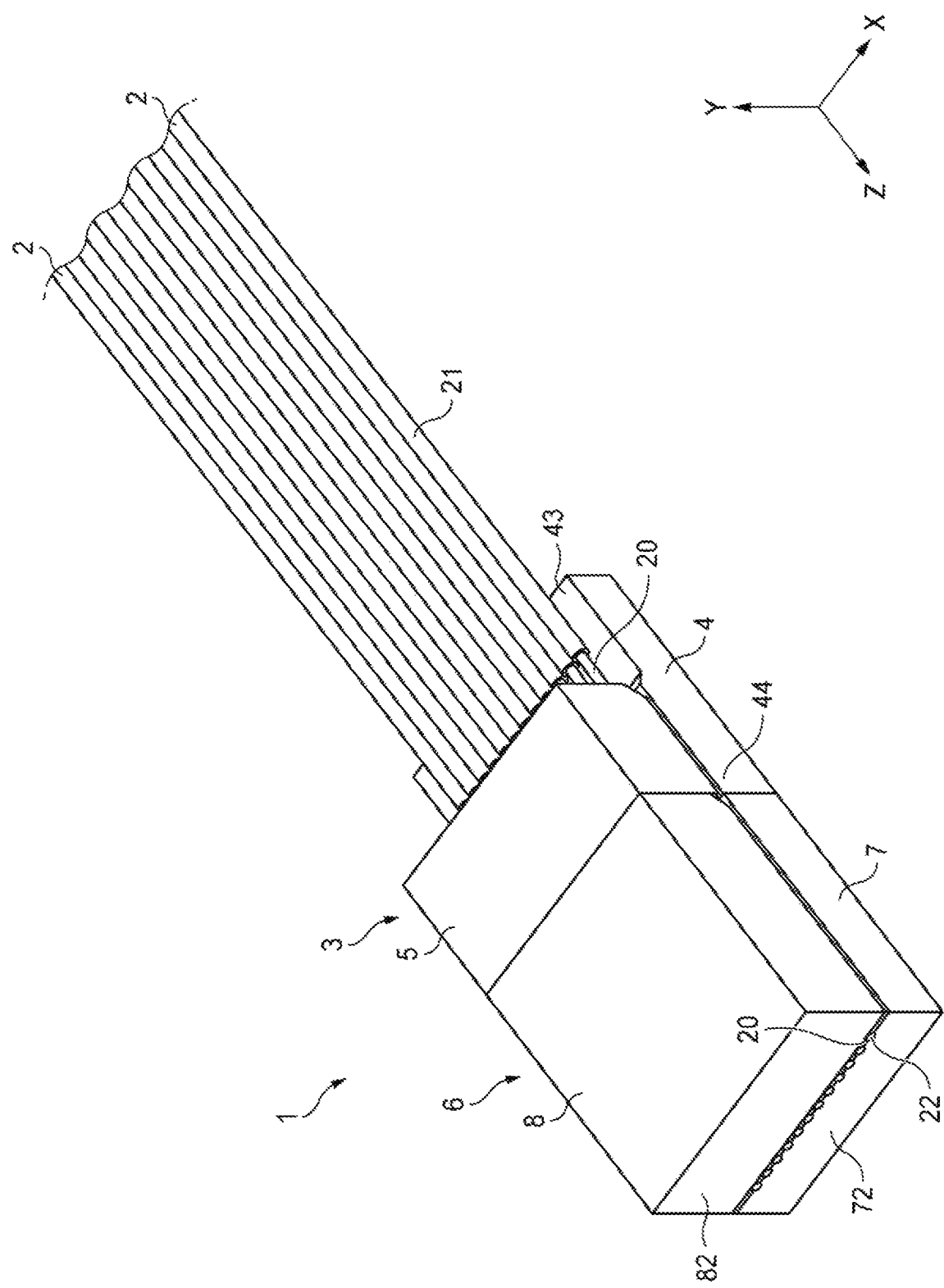
FIG. 1 is a perspective view illustrating an optical fiber connection component according to a first embodiment of the present disclosure.

In the method for manufacturing an optical connector including a multi-core fiber, after the multi-core fiber is performed to rotational alignment, the multi-core fiber and a connector ferrule are fixed by a bonding agent. Thereafter, an end face of the multi-core fiber protruding from the connector ferrule is grinded so that the end face of the multi-core fiber and an end face of the connector ferrule are flush with each other.

In many cases, a position of a core of the multi-core fiber changes along a longitudinal direction of the multi-core fiber. In this case, the position of the core on the end face of the multi-core fiber after the grinding step of the multi-core fiber may change from a position of the core on the end face of the multi-core fiber observed in a rotational alignment step according to a grinding amount of the end face of the multi-core fiber. For this reason, the position of the core on the end face of the multi-core fiber in the manufactured optical connector deviates from a desired position adjusted in the rotational alignment step, and a coupling loss between the optical connector and an external optical component such as an optical waveguide may increase. As described above, there is room for improving optical characteristics of the optical connector including the multi-core fiber.

First, the contents of embodiments of the present disclosure will be listed and described.

(1) A method for manufacturing an optical fiber connection component, including: a step of preparing one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis; a first mounting step of mounting the one or the plurality of optical fibers on a first optical fiber holding member so that one or a plurality of glass fibers exposed from the resin coating portion are arranged side by side in a first direction and protrude to an outside from the first optical fiber holding member; a rotational alignment step of adjusting an azimuth around a central axis for the one or the plurality of optical fibers; a first bonding step of bonding the one or the plurality of glass fibers to the first optical fiber holding member using a first bonding agent; a second mounting step of mounting the one or the plurality of glass fibers on a second optical fiber holding member so that one or a plurality of glass fibers protruding to the outside from the first optical fiber holding member are arranged side by side in the first direction; a second bonding step of bonding the one or the plurality of glass fibers to the second optical fiber holding member using a second bonding agent; and a step of grinding an end face of the one or the plurality of glass fibers and an end face of the second optical fiber holding member so that the end face of the one or the plurality of glass fibers is flush with the end face of the second optical fiber holding member.

According to the above manufacturing method, it is possible to reduce a grinding amount of the end face of each glass fiber. Therefore, even when a position of the core of the glass fiber changes along a longitudinal direction of the glass fiber, the position of the core on the end face of the glass fiber at a time point when the grinding of the end face of the glass fiber is finished does not greatly change from a position of the core on the end face of the glass fiber observed immediately after the rotational alignment step of the optical fiber. Therefore, it is possible to prevent a situation in which a coupling loss between the optical fiber connection component and an external optical component (for example, an optical waveguide) is increased.

(2) The method for manufacturing the optical fiber connection component according to (1), further including: a holding member bonding step of bonding the first optical fiber holding member and the second optical fiber holding member to each other.

According to the above manufacturing method, since the first optical fiber holding member and the second optical fiber holding member are fixed to each other, the strength of the optical fiber connection component can be increased.

(3) The method for manufacturing the optical fiber connection component according to (1) or (2), in which the first optical fiber holding member includes a first board that has one or a plurality of first groove portions each of which holds a corresponding one of the one or the plurality of glass fibers, and a first lid portion that faces the first board with the one or the plurality of glass fibers interposed therebetween; the second optical fiber holding member includes a second board that has one or a plurality of second groove portions each of which holds a corresponding one of the one or the plurality of glass fibers, and a second lid portion that faces the second board with the one or the plurality of glass fibers interposed therebetween; the first mounting step includes mounting the one or the plurality of optical fibers on the first board so that each of one or a plurality of glass fibers exposed from the resin coating portion is held in a corresponding one of the one or the plurality of first groove portions and protrudes to an outside from the first board; the first bonding step includes providing the first bonding agent in the one or the plurality of first groove portions so that the one or the plurality of glass fibers are bonded to the first board and the first lid portion; the second mounting step includes mounting the one or the plurality of glass fibers on the second board so that each of one or a plurality of glass fibers protruding to the outside from the first board is held in a corresponding one of the one or the plurality of second groove portions; the second bonding step includes providing the second bonding agent in the one or the plurality of second groove portions so that the one or the plurality of glass fibers are bonded to the second board and the second lid portion; and the grinding step includes grinding an end face of the one or the plurality of glass fibers, an end face of the second board, and an end face of the second lid portion so that the end face of the one or the plurality of glass fibers is flush with the end face of the second board and the end face of the second lid portion.

According to the above manufacturing method, the optical fiber can be easily mounted on the first optical fiber holding member, and the optical fiber can be arranged with high accuracy on the first optical fiber holding member.

(4) The method for manufacturing the optical fiber connection component according to (3), in which the second lid portion faces the first board and the second board, and in the second bonding step, the second bonding agent is provided between the first board and the second lid portion so that the second board is fixed to the first board via the second lid portion.

According to the manufacturing method, the first board and the second board can be indirectly fixed to each other without providing a step of directly bonding the first board and the second board using a bonding agent.

(5) The method for manufacturing the optical fiber connection component according to (1) or (2), in which the first optical fiber holding member includes a first hole capillary having one or a plurality of first hole portions each of which holds a corresponding one of the one or the plurality of glass fibers, and the second optical fiber holding member includes a second hole capillary having one or a plurality of second hole portions each of which holds a corresponding one of the one or the plurality of glass fibers.

According to the above manufacturing method, the number of components can be reduced, and the number of assembling steps can be reduced.

(6) The method for manufacturing the optical fiber connection component according to any one of (1) to (5), in which the one or the plurality of optical fibers are a plurality of optical fibers included in an intermittent bonded-type fiber ribbon.

According to the above manufacturing method, a step of separating the optical fibers can be omitted by mounting, on the first optical fiber holding member, a portion of the intermittent bonded-type fiber ribbon in which the optical fibers are not integrated.

(7) The method for manufacturing the optical fiber connection component according to any one of (1) to (5), in which the one or the plurality of optical fibers are a plurality of optical fibers that are not bonded to each other.

According to the above manufacturing method, a step of separating the optical fibers can be omitted.

(8) The method for manufacturing the optical fiber connection component according to any one of (1) to (7), in which each of the one or the plurality of optical fibers is a multi-core fiber having a plurality of cores.

According to the above manufacturing method, it is possible to manufacture an optical fiber connection component capable of connecting one or a plurality of multi-core fibers with a low loss.

(9) The method for manufacturing the optical fiber connection component according to any one of (1) to (7), in which each of the one or the plurality of optical fibers is a polarization maintaining fiber.

According to the above manufacturing method, it is possible to manufacture an optical fiber connection component capable of connecting one or a plurality of polarization maintaining fibers with low crosstalk.

(10) An optical fiber connection component, including: one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis; a first optical fiber holding member holding the one or the plurality of glass fibers so that one or a plurality of glass fibers exposed from the resin coating portion are arranged side by side in a first direction; and a second optical fiber holding member holding the one or the plurality of glass fibers so that the one or the plurality of glass fibers protruding from the first optical fiber holding member are arranged side by side in the first direction. An end face of the second optical fiber holding member is flush with an end face of the one or the plurality of glass fibers.

According to the above configuration, since one or a plurality of glass fibers protruding from the first optical fiber holding member are held by the second optical fiber holding member, it is possible to reduce a grinding amount of end faces of the glass fibers protruding to the outside from the first optical fiber holding member. Therefore, it is possible to prevent a situation in which a position of the core on the end face of the glass fiber of the manufactured optical fiber connection component deviates from a desired position obtained by adjustment in a rotational alignment step, and thus it is possible to prevent a situation in which a coupling loss between the optical fiber connection component and an external optical component (for example, an optical waveguide) is increased. In this way, it is possible to improve optical characteristics of the optical fiber connection component.

(11) The optical fiber connection component according to (10), in which the first optical fiber holding member is fixed to the second optical fiber holding member by a bonding agent.

According to the above configuration, since the first optical fiber holding member is fixed to the second optical fiber holding member by the bonding agent, the strength of the optical fiber connection component can be increased.

(12) The optical fiber connection component according to (10) or (11), in which the first optical fiber holding member includes a first board that has one or a plurality of first groove portions each of which holds a corresponding one of the one or the plurality of glass fibers, and a first lid portion that faces the first board with the one or the plurality of glass fibers interposed therebetween; and the second optical fiber holding member includes a second board that has one or a plurality of second groove portions each of which holds a corresponding one of the one or the plurality of glass fibers, and a second lid portion that faces the second board with the one or the plurality of glass fibers interposed therebetween.

According to the above configuration, the glass fibers exposed from the resin coating portion can be held by the first board and the first lid portion so as to be arranged side by side in the first direction, and the glass fibers protruding from the first board can be held by the second board and the second lid portion so as to be arranged side by side in the first direction.

(13) The optical fiber connection component according to (12), in which the one or the plurality of optical fibers are a plurality of optical fibers; the one or the plurality of first groove portions are a plurality of first groove portions that are arranged in parallel to each other each other and each of which holds a corresponding one of a plurality of glass fibers exposed at respective end portions of the plurality of optical fibers; and the one or the plurality of second groove portions are a plurality of second groove portions that are arranged in parallel to each other and each of which holds a corresponding one of the plurality of glass fibers.

According to the above configuration, the plurality of optical fibers can be arranged side by side in the first direction using the plurality of first groove portions, and the plurality of optical fibers can be arranged side by side in the first direction using the plurality of second groove portions.

(14) The optical fiber connection component according to (12) or (13), in which the second lid portion faces the first board and the second board, and the second board is fixed to the first board via the second lid portion.

According to the above configuration, since the second board is fixed to the first board via the second bonding agent and the second lid portion, the strength of the optical fiber connection component can be increased.

(15) The optical fiber connection component according to (10) or (11), in which the first optical fiber holding member includes a first hole capillary having one or a plurality of first hole portions each of which holds a corresponding one of the one or the plurality of glass fibers; and the second optical fiber holding member includes a second hole capillary having one or a plurality of second hole portions each of which holds a corresponding one of the one or the plurality of glass fibers.

According to the above configuration, the glass fibers exposed from the resin coating portion can be held by the first hole capillary so as to be arranged side by side in the first direction, and the glass fibers protruding from the first hole capillary can be held by the second hole capillary so as to be arranged side by side in the first direction.

(16) The optical fiber connection component according to (15), in which the one or the plurality of optical fibers are a plurality of optical fibers; the one or the plurality of first hole portions are a plurality of first hole portions that are arranged in parallel to each other and each of which holds a corresponding one of a plurality of glass fibers exposed at respective end portions of the plurality of optical fibers; and the one or the plurality of second hole portions are a plurality of second hole portions that are arranged in parallel to each other and each of which holds a corresponding one of the plurality of glass fibers.

According to the above configuration, the plurality of optical fibers can be arranged side by side in the first direction using the plurality of first hole portions, and the plurality of optical fibers can be arranged side by side in the first direction using the plurality of second hole portions.

Effects of Present Disclosure

According to the present disclosure, it is possible to provide a method for manufacturing an optical fiber connection component capable of improving optical characteristics of an optical fiber connection component, and to provide an optical fiber connection component having improved optical characteristics.

Description of Embodiments of Present Disclosure

Hereinafter, embodiments will be described with reference to the drawings. Dimensions of respective members illustrated in the drawings may be different from actual dimensions of the respective members for convenience of description. In the description of the embodiments, in order to facilitate understanding, a Z-axis extending along a central axis of an optical fiber held by an optical fiber holding member, an X-axis extending along an arrangement direction of a plurality of optical fibers that is perpendicular to the Z-axis, and a Y-axis perpendicular to the Z-axis and the X-axis will be described. In the present embodiment, an optical fiber connection component 1 functions as an optical fiber array including a plurality of optical fibers 2. When optically connecting the optical fiber of the optical fiber connection component 1 and another optical fiber, the optical fiber connection component 1 functions as an optical connector.

First Embodiment

FIG. 1 is a perspective view illustrating the optical fiber connection component 1 according to a first embodiment. The optical fiber connection component 1 includes the plurality of optical fibers 2 (twelve optical fibers 2 in the first embodiment) arranged side by side in the X-axis direction (a first direction), a first optical fiber holding member 3 that holds the plurality of optical fibers 2, and a second optical fiber holding member 6 that holds glass fibers 20 of the plurality of optical fibers 2.

Figure 2:
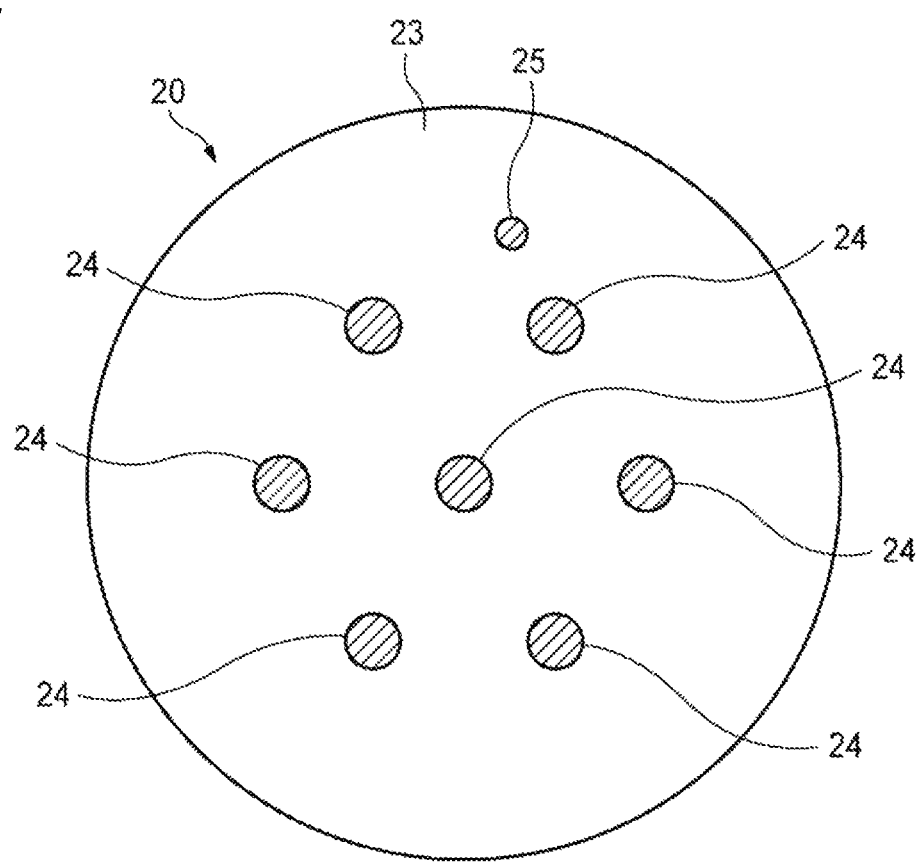
FIG. 2 is a cross-sectional view illustrating an example of a glass fiber included in the optical fiber connection component of the present disclosure.

The optical fibers 2 are arranged side by side in the X-axis direction in a state of being separated from each other. As illustrated in FIG. 2, each optical fiber 2 has a structure that is not axis-symmetric with respect to a central axis (not shown) of the optical fiber 2 extending in a longitudinal direction in a cross section perpendicular to the central axis. For this reason, it is necessary to perform rotational alignment with respect to each optical fiber 2. In the first embodiment, each optical fiber 2 is a multi-core fiber having a plurality of cores 24. Each optical fiber 2 includes the glass fiber 20 and a resin coating portion 21 that coats the glass fiber 20.

The glass fiber 20 includes a plurality of cores 24 through which signal light propagates, a marker 25, and a cladding 23 that covers the plurality of cores 24 and the marker 25. A refractive index of each core 24 is larger than a refractive index of the cladding 23. A refractive index of the marker 25 is different from the refractive index of the cladding 23. The marker 25 is used in a rotational alignment step of the optical fiber 2, which will be described later.

As illustrated in FIG. 1, in each optical fiber 2, an end portion of the glass fiber 20 is exposed from the resin coating portion 21. The first optical fiber holding member 3 holds the plurality of glass fibers 20 so that the plurality of glass fibers 20 exposed from the resin coating portion 21 are arranged side by side in the X-axis direction. The first optical fiber holding member 3 includes a first board 4, and a first lid portion 5 that faces the first board 4 with the plurality of glass fibers 20 interposed therebetween. The first board 4 has a holding region 43 for holding the resin coating portion 21 and a holding region 44 for holding each glass fiber 20 exposed from the resin coating portion. The holding region 44 is provided with a plurality of first groove portions 46 (see FIG. 4) each of which has a V-shaped cross section and holds one corresponding glass fiber 20.

The second optical fiber holding member 6 holds the plurality of glass fibers 20 so that the plurality of glass fibers 20 protruding from the first optical fiber holding member 3 in the Z-axis direction are arranged side by side in the X-axis direction. The second optical fiber holding member 6 includes a second board 7, and a second lid portion 8 that faces the second board 7 with the plurality of glass fibers 20 interposed therebetween. The second board 7 is provided with a plurality of second groove portions 76 (see FIG. 8) each of which has a V-shaped cross section and holds one corresponding glass fiber 20.

The second optical fiber holding member 6 is fixed to the first optical fiber holding member 3 by using a bonding agent. In particular, the second board 7 is fixed to the first board 4 by using a bonding agent, and the second lid portion 8 is fixed to the first lid 5 by using a bonding agent. An end face of the second optical fiber holding member 6 is flush with an end face 22 of each glass fiber 20. In particular, an end face 72 of the second board 7 and an end face 82 of the second lid portion 8 are flush with the end face 22 of each glass fiber 20.

Figure 3:
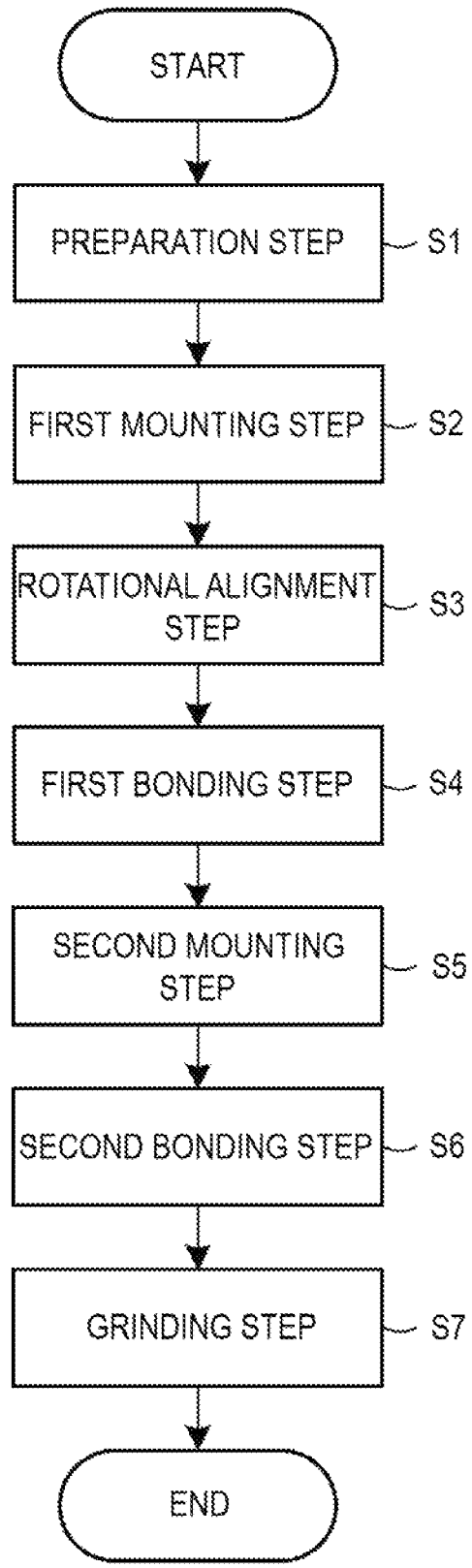
FIG. 3 is a flowchart for illustrating a method for manufacturing an optical fiber connection component according to the present disclosure.

FIG. 3 is a flowchart illustrating a method for manufacturing the optical fiber connection component 1 according to the present disclosure. In a preparation step S1, a plurality of optical fibers 2 in which end portions of the glass fibers 20 are exposed from the resin coating portions 21 are prepared. In the first embodiment, since the plurality of optical fibers 2 are not bonded to each other, there is no need to separately provide a step of separating the optical fibers 2. Further, by using a predetermined tool, the end portion of each glass fiber 20 can be exposed from the resin coating portion 21.

Figure 4:
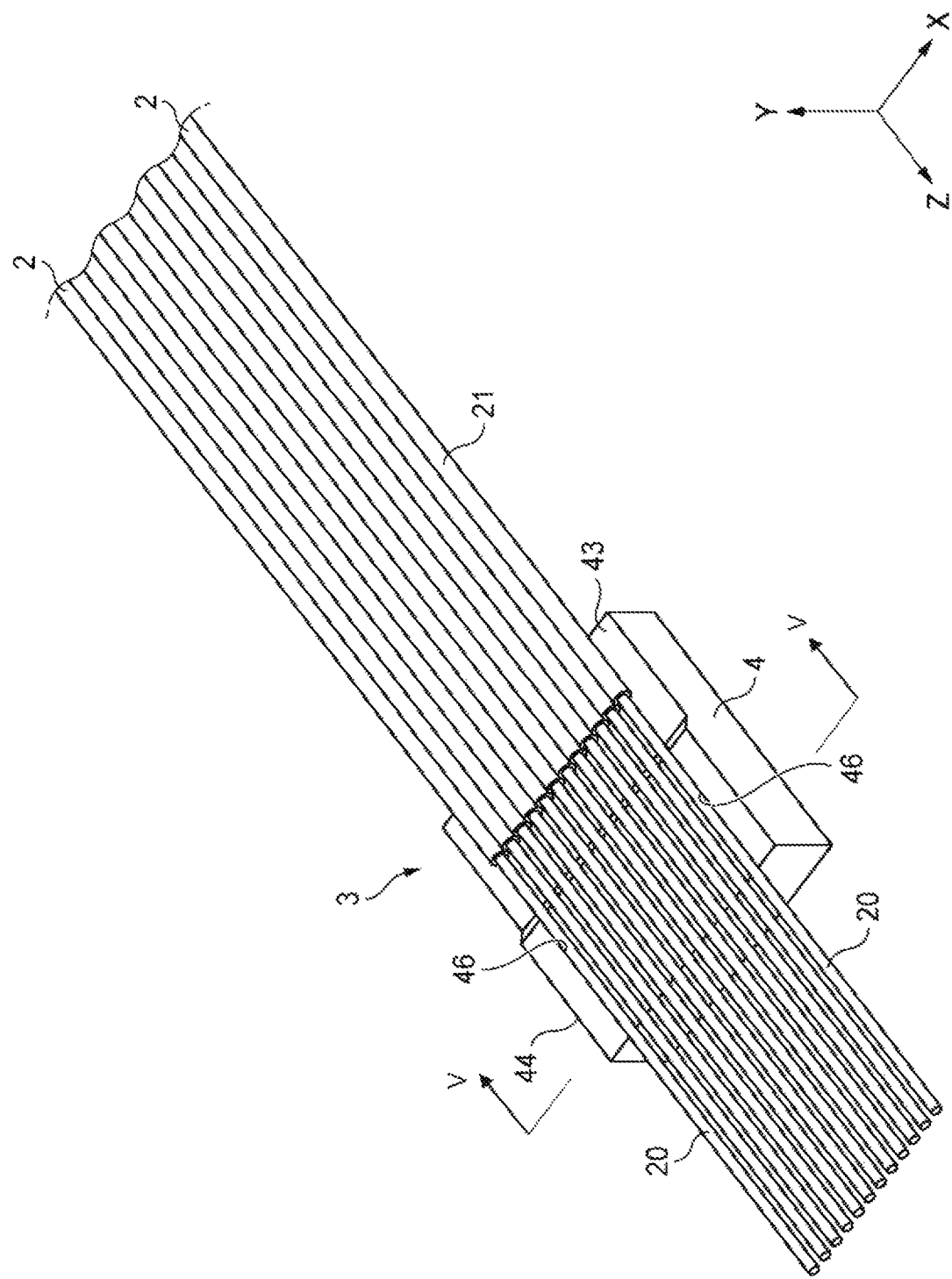
FIG. 4 is a perspective view illustrating a state where a plurality of optical fibers are mounted on a first board in a first mounting step in the method for manufacturing an optical fiber connection component according to the present disclosure.
Figure 5:
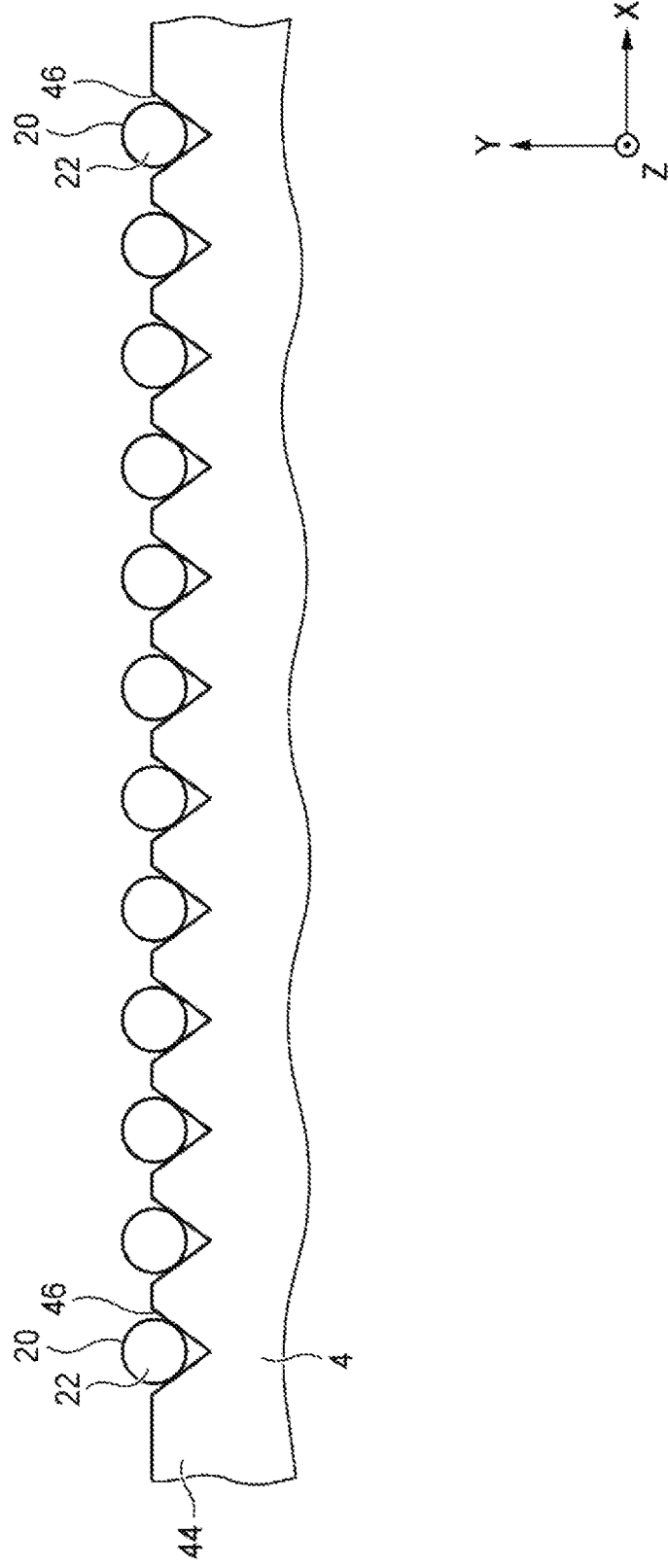
FIG. 5 is a cross-sectional view taken along a line V-V in FIG. 4.

Next, in a first mounting step S2, the plurality of optical fibers 2 are mounted on the first optical fiber holding member 3. As illustrated in FIG. 4, the optical fibers 2 are mounted on the first board 4, so that the glass fibers 20 exposed from the resin coating portions 21 are arranged side by side in the X-axis direction and protrude to the outside from the first board 4 in the Z-axis direction. In addition, the resin coating portions 21 are held in the holding region 43 of the first board 4, and each of the plurality of glass fibers 20 exposed from the resin coating portions 21 is held in a corresponding one of the plurality of first groove portions 46 in the holding region 44 of the first board 4 (see FIG. 5).

Next, in the rotational alignment step S3, an azimuth (rotational position) around the central axis of each optical fiber 2 is adjusted (that is, rotational alignment for each optical fiber 2 is performed). For example, a surface of each glass fiber 20 protruding from the first optical fiber holding member 3 may be imaged by a camera (not shown). Thereafter, an rotational alignment device (not shown) may automatically adjust the rotational position of each glass fiber 20 based on an imaged image thereof that is acquired by the camera and that shows the surface of the glass fiber 20. In this regard, the rotational position of the glass fiber 20 may be adjusted so that a rotational position of the marker 25 (see FIG. 2) of the glass fiber 20 coincides with a predetermined rotational position. In this way, rotational positions of the plurality of cores 24 are adjusted to desired rotational positions through the rotational alignment step of the optical fiber 2.

Next, in a first bonding step S4, the plurality of glass fibers 20 are bonded to the first optical fiber holding member 3 using an ultraviolet curable resin (an example of a first bonding agent 10). Specifically, after the rotational alignment of the optical fiber 2 is performed in the rotational alignment step S3, the first lid portion 5 is disposed on the holding region 44 of the first board 4 with the glass fibers 20 interposed therebetween (see FIG. 6). Next, in a state where each glass fiber 20 is fixed by the first lid portion 5 and the first groove portion 46 of the first board 4, the ultraviolet curable resin is introduced into a gap between the first groove portion 46 and the first lid portion 5 and a gap between the first board 4 and the first lid portion 5 (see FIGS. 7A and 7B). The ultraviolet curable resin may be poured into the gap between the first lid portion 5 and the first board 4 from the holding region 43 side. Thereafter, the ultraviolet curable resin is cured by irradiating the ultraviolet curable resin with ultraviolet light. In this way, each glass fiber 20 is bonded to the first board 4 and the first lid portion 5 by the ultraviolet curable resin.

Figure 8:
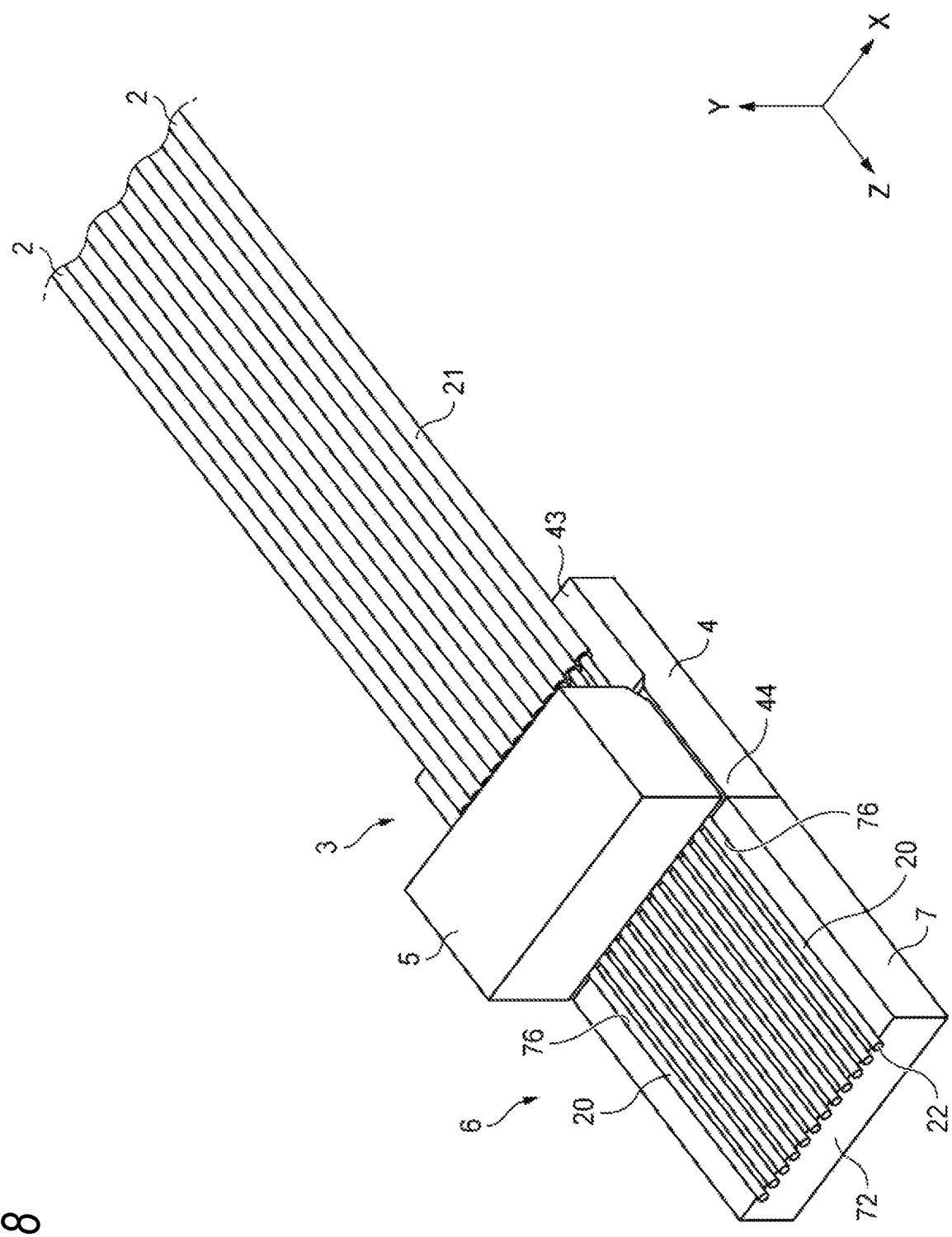
FIG. 8 is a perspective view illustrating a state where each glass fiber protruding from the first optical fiber holding member is mounted on a second board in a second mounting step in the method for manufacturing an optical fiber connection component according to the present disclosure.

Next, in a second mounting step S5, the plurality of glass fibers 20 protruding to the outside from the first optical fiber holding member 3 in the Z-axis direction are mounted on the second optical fiber holding member 6. As illustrated in FIG. 8, the optical fibers 2 are mounted on the second board 7 so that the glass fibers 20 protruding from the first optical fiber holding member 3 are arranged side by side in the X-axis direction. In particular, each of the plurality of glass fibers 20 is held in a corresponding one of the plurality of second groove portions 76 in the second board 7. In this state, a tip of each glass fiber 20 slightly protrudes from the end face 72 of the second board 7 in the Z-axis direction. In this step, the second board 7 is bonded to the first board 4 using a bonding agent.

Figure 9:
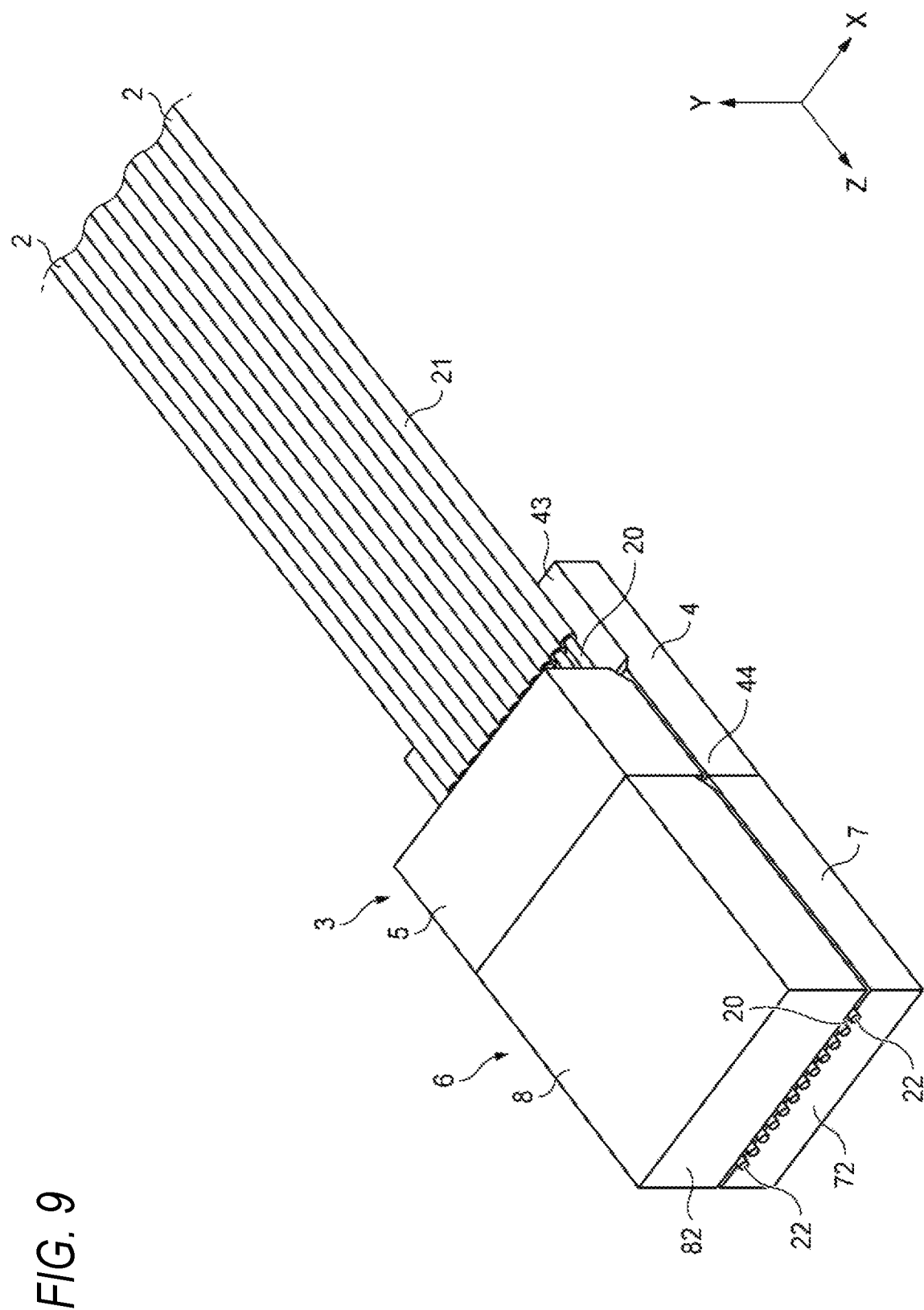
FIG. 9 is a perspective view illustrating a state where each glass fiber is held by a second optical fiber holding member in a second bonding step in the method for manufacturing an optical fiber connection component according to the present disclosure.

Next, in a second bonding step S6, the plurality of glass fibers 20 are bonded to the second optical fiber holding member 6 using an ultraviolet curable resin (an example of a second bonding agent 12). Specifically, as illustrated in FIG. 9, the second lid portion 8 is disposed on the second board 7 with the glass fibers 20 interposed therebetween. Next, in a state where each glass fiber 20 is fixed by the second lid portion 8 and the second groove portion 76 of the second board 7, the ultraviolet curable resin is introduced into a gap between the second groove portion 76 and the second lid portion 8 and a gap between the second board 7 and the second lid portion 8. The ultraviolet curable resin may be poured into the gap between the second lid portion 8 and the second board 7 from the end face 22 side of each glass fiber 20. Thereafter, the ultraviolet curable resin is cured by irradiating the ultraviolet curable resin with ultraviolet light. In this way, each glass fiber 20 is bonded to the second board 7 and the second lid portion 8 by the ultraviolet curable resin. In this step, the second lid portion 8 is bonded to the first lid portion 5 using a bonding agent.

Figure 10:
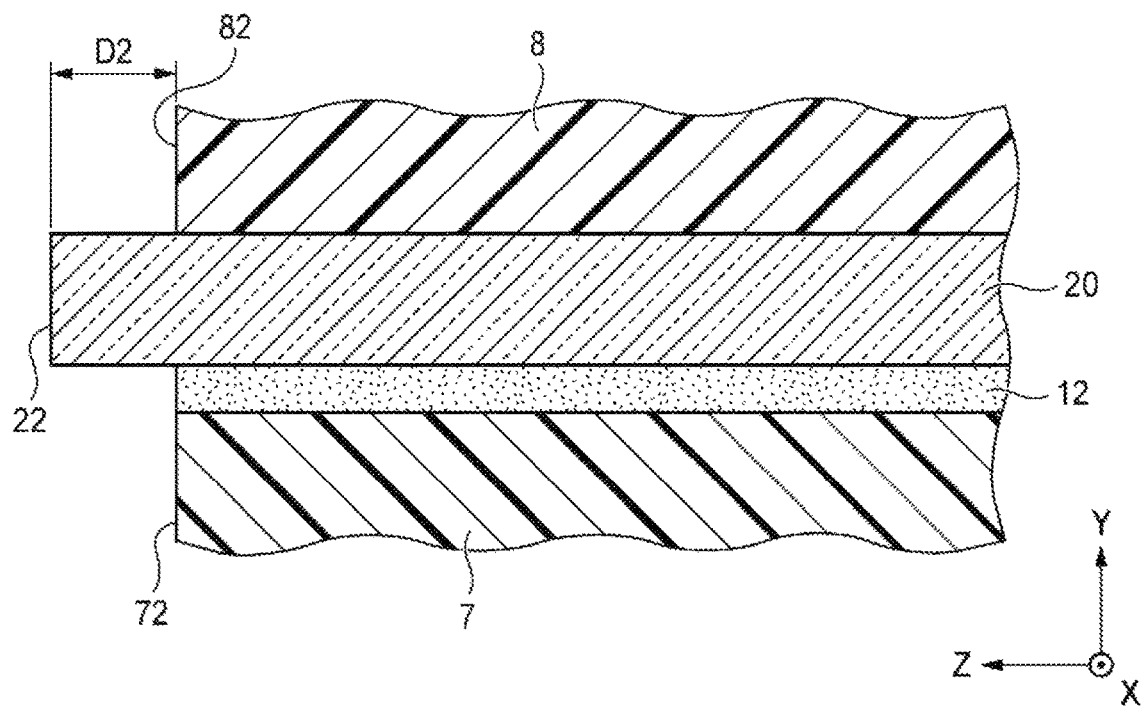
FIG. 10 is a cross-sectional view of the glass fiber, the second board, and a second lid portion in the optical fiber connection component according to the first embodiment of the present disclosure.

Next, in a grinding step S7, the end faces 22 of the plurality of glass fibers 20 and the end faces of the second optical fiber holding member 6 are grinded. Specifically, the end face 22 of each glass fiber 20, the end face 72 of the second board 7, and the end face 82 of the second lid portion 8 are grinded so that the end face 22 of each glass fiber 20, the end face 72 of the second board 7, and the end face 82 of the second lid portion 8 are flush with each other. For example, as illustrated in FIG. 10, when a protruding amount of the glass fiber 20 protruding from the end face 72 of the second board 7 and the end face 82 of the second lid portion 8 in the Z-axis direction is D2 (mm), a grinding amount of the glass fiber 20 is D2 or more. In this way, after the polishing step S7, the optical fiber connection component 1 as illustrated in FIG. 1 is manufactured.

Figure 6:
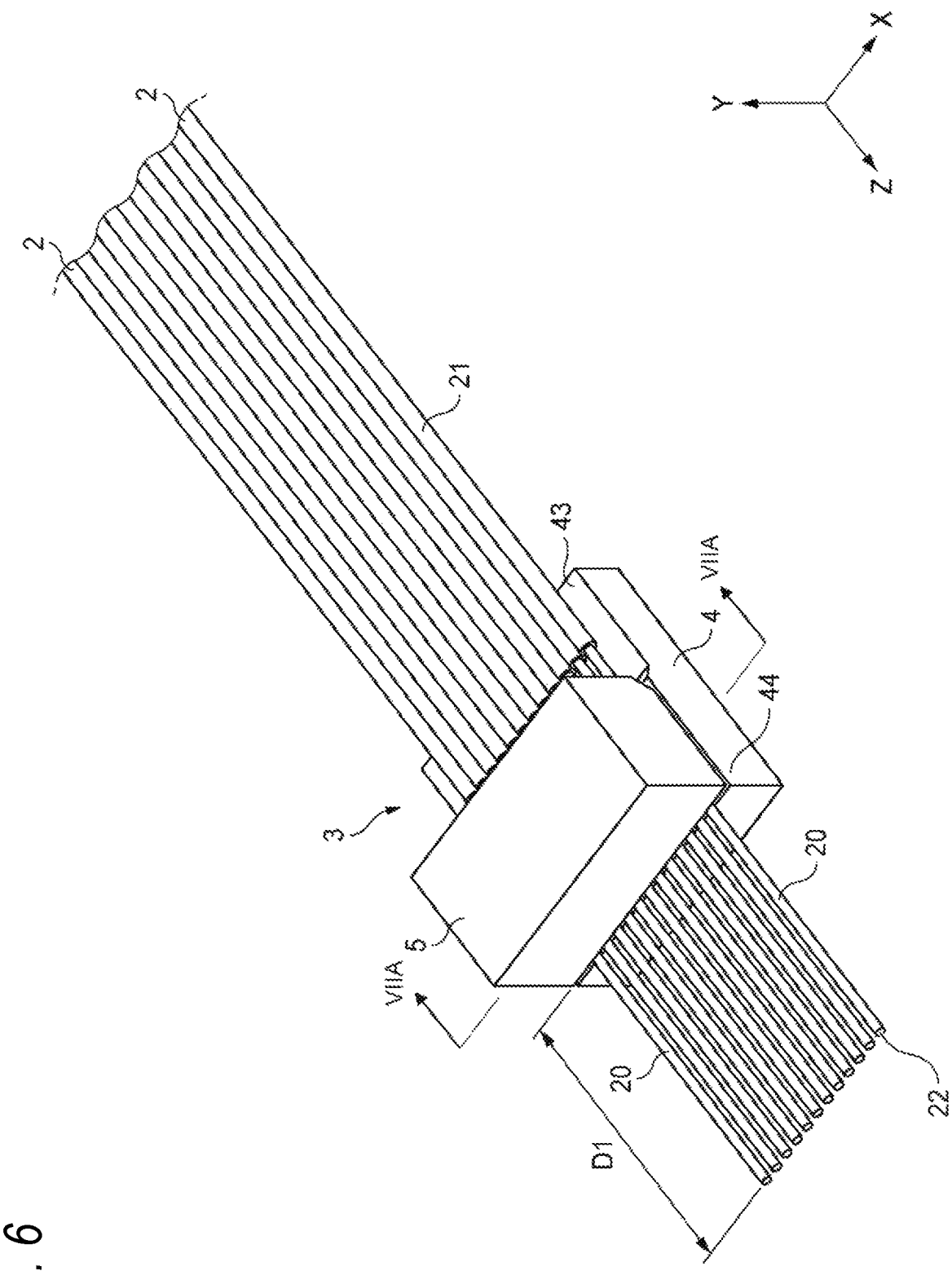
FIG. 6 is a perspective view illustrating a state where each glass fiber is held by a first optical fiber holding member in the first mounting step in the method for manufacturing an optical fiber connection component according to the present disclosure.
Figure 7A:
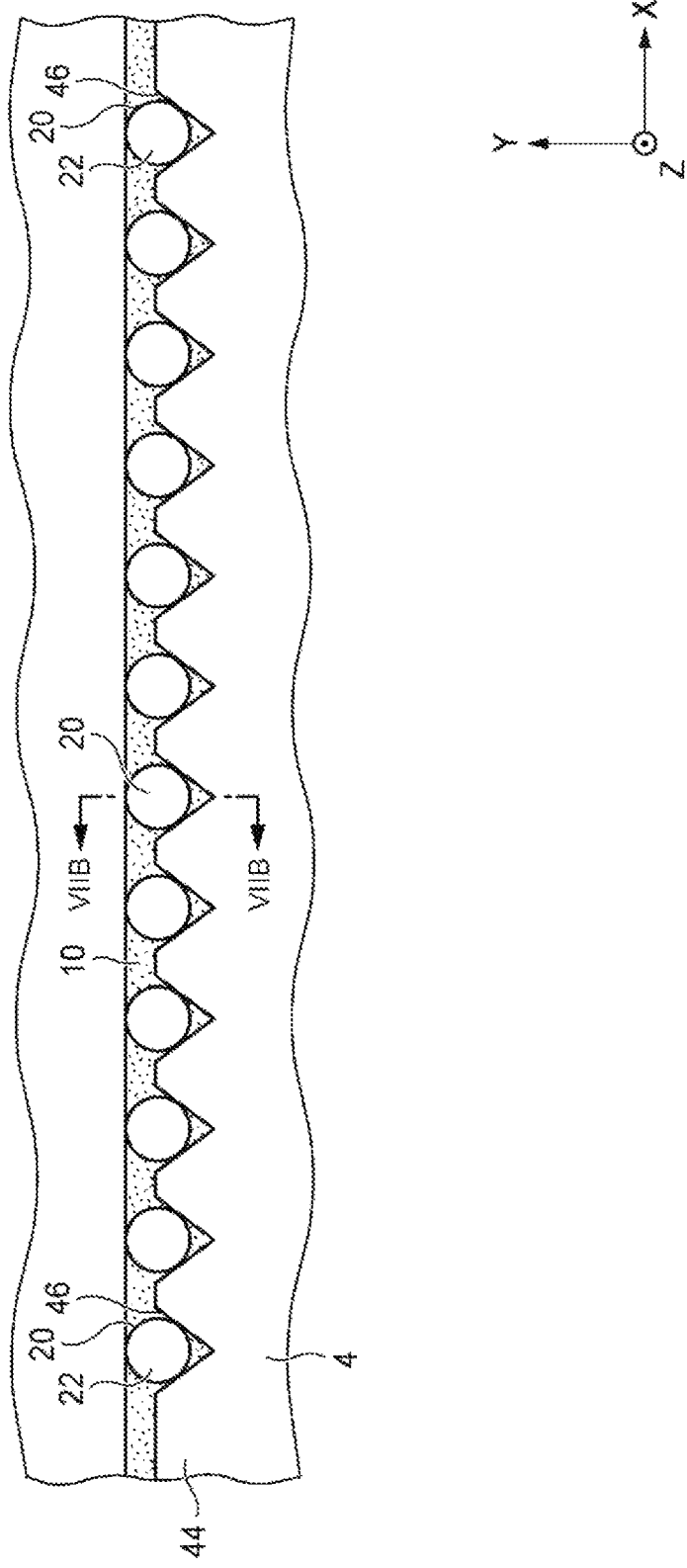
FIG. 7A is a cross-sectional view taken along a line VIIA-VIIA in FIG. 6, illustrating a state where each glass fiber is bonded to a first board and a first lid portion by a first bonding agent.
Figure 7B:
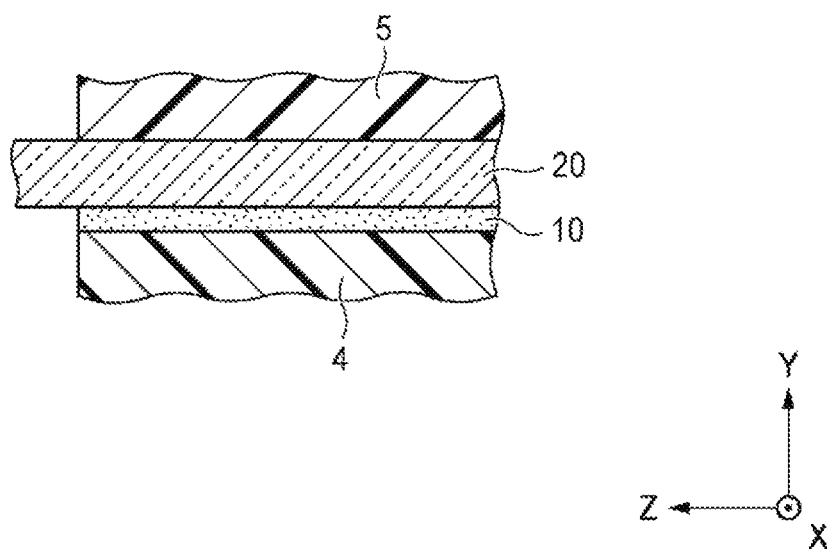
FIG. 7B is a cross-sectional view of the glass fiber, the first board, and the first lid portion, taken along a VIIB-VIIB line in FIG. 7A.

Since the protruding amount D2 of each glass fiber 20 protruding from the second optical fiber holding member 6 is shorter as compared with a protruding amount D1 (mm) of each glass fiber 20 protruding from the first optical fiber holding member 3 as illustrated in FIG. 6, according to the first embodiment, it is possible to reduce the grinding amount of the end face 22 of each glass fiber 20 in the grinding step. As described above, even when the position of the core 24 of the glass fiber 20 changes along the longitudinal direction of the glass fiber 20, the rotational position of the core 24 on the end face 22 of the glass fiber 20 at a time point when the grinding of the end face 22 of the glass fiber 20 is finished does not greatly change from the rotational position of the core 24 on the end face 22 of the glass fiber 20 observed during rotational alignment of the optical fiber 2.

Therefore, it is possible to prevent a situation in which the rotational position of the core 24 on the end face 22 of the glass fiber 20 of the optical fiber connection component 1 manufactured after the grinding step of the glass fiber 20 deviates from a desired position obtained by adjustment in the rotational alignment step. Therefore, it is possible to prevent a situation in which a coupling loss between the optical fiber connection component 1 and an external optical component (an optical waveguide or another optical fiber) is increased. As described above, the optical characteristics of the optical fiber connection component 1 can be improved using the method for manufacturing the optical fiber connection component 1 according to the first embodiment. Further, according to the first embodiment, since the first optical fiber holding member 3 and the second optical fiber holding member 6 are fixed to each other using a bonding agent, it is possible to secure the strength of the optical fiber connection component 1.

In the first embodiment, the glass fibers 20 and the first optical fiber holding member 3 are bonded to each other using an ultraviolet curable resin as an example of the bonding agent, and the glass fibers 20 and the second optical fiber holding member 6 are bonded to each other, and the first embodiment is not limited thereto. For example, as another example of the bonding agent, a thermosetting resin may be used instead of the ultraviolet curable resin.

Although the optical fiber connection component 1 includes the twelve optical fibers 2 in the first embodiment, the number of the optical fibers 2 mounted on the optical fiber connection component 1 is not particularly limited. For example, the number of optical fibers 2 mounted on the optical fiber connection component 1 may be one.

Second Embodiment

Figure 11:
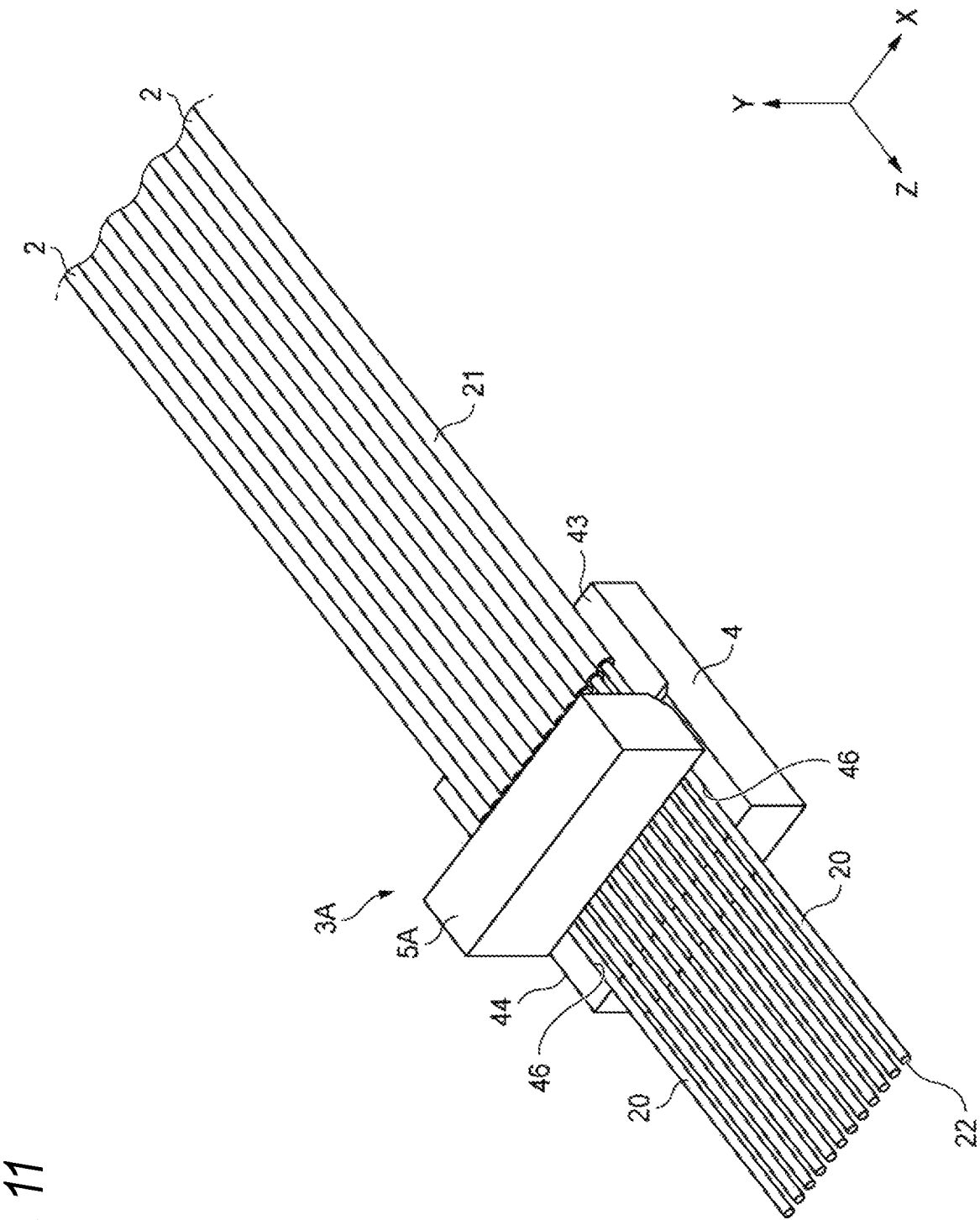
FIG. 11 is a diagram for illustrating a method for manufacturing an optical fiber connection component according to a second embodiment of the present disclosure.
Figure 12:
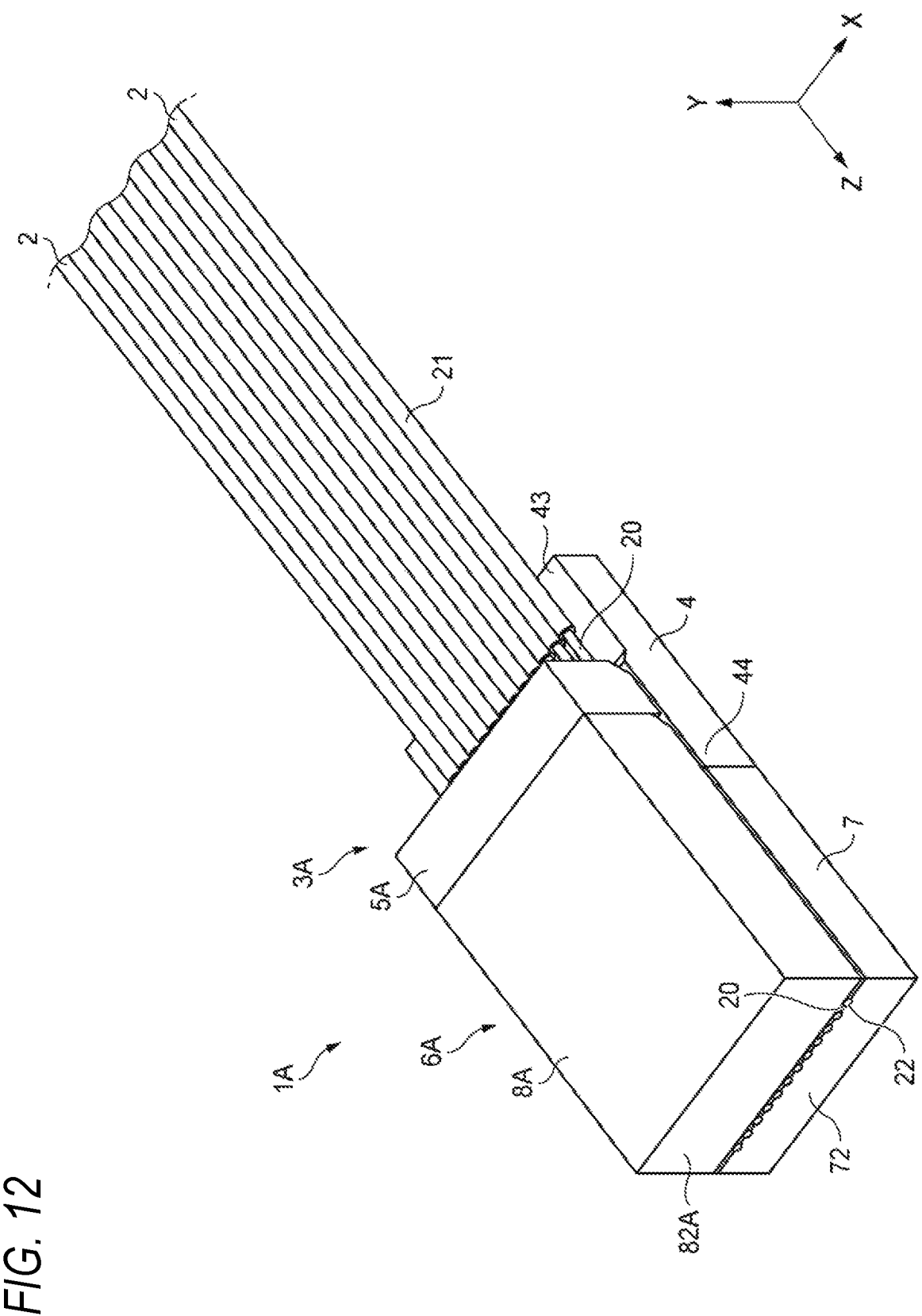
FIG. 12 is a perspective view illustrating an optical fiber connection component according to a second embodiment.

Next, an optical fiber connection component 1A and a method for manufacturing the optical fiber connection component 1A according to a second embodiment of the present disclosure will be described below with reference to FIGS. 3, 11, and 12. FIG. 11 is a diagram for illustrating the method for manufacturing the optical fiber connection component 1A according to the second embodiment. FIG. 12 is a perspective view illustrating the optical fiber connecting component 1A.

As illustrated in FIG. 12, the optical fiber connection component 1A according to the second embodiment is different from the optical fiber connection component 1 according to the first embodiment in that outer-shape sizes of a first lid portion 5A and a second lid portion 8A are different from those of counterparts thereof. In the following description, differences between the optical fiber connection component 1 according to the first embodiment and the optical fiber connection component 1A according to the second embodiment will be mainly described. In the second embodiment, components having the same reference signs as those described in the first embodiment are not repeatedly described.

As illustrated in FIG. 12, the optical fiber connection component 1A includes a plurality of optical fibers 2, a first optical fiber holding member 3A, and a second optical fiber holding member 6A. The first optical fiber holding member 3A includes the first board 4, and the first lid portion 5A that faces the first board 4 with the glass fibers 20 interposed therebetween. The outer-shape size of the first lid portion 5A in the Z-axis direction in the second embodiment is smaller than the outer-shape size of the first lid portion 5 in the Z-axis direction in the first embodiment. The second optical fiber holding member 6A includes the second board 7, and the second lid portion 8A that faces the first board 4 and the second board 7 with the glass fibers 20 interposed therebetween. The outer-shape size of the second lid portion 8A in the Z-axis direction in the second embodiment is larger than the outer-shape size of the second lid portion 8 in the Z-axis direction in the first embodiment.

A part of the second lid portion 8A is bonded to the glass fibers 20 and the first board 4 by an ultraviolet curable resin, and the remaining part of the second lid portion 8A is bonded to the glass fibers 20 and the second board 7 by an ultraviolet curable resin. As described above, in the optical fiber connection component 1A according to the second embodiment, since the second board 7 is fixed to the first board 4 via the second lid portion 8A, the strength of the optical fiber connection component 1A can be increased.

Next, the method for manufacturing the optical fiber connection component 1A will be described with reference to FIG. 3. As illustrated in FIG. 3, after the preparation step S1 to the rotational alignment step S3 are performed, the glass fibers 20 are bonded to the first optical fiber holding member 3A using an ultraviolet curable resin (first bonding step S4). More specifically, the first lid portion 5A is disposed on the holding region 44 of the first board 4 with the glass fibers 20 interposed therebetween (see FIG. 11). Next, in a state where each glass fiber 20 is fixed by the first lid portion 5A and the first groove portion 46 of the first board 4, the ultraviolet curable resin is introduced into a gap between the first groove portion 46 and the first lid portion 5A and a gap between the first board 4 and the first lid portion 5A. Thereafter, the ultraviolet curable resin is cured by irradiating the ultraviolet curable resin with ultraviolet light. In this way, each glass fiber 20 is bonded to the first board 4 and the first lid portion 5A by the ultraviolet curable resin.

Next, in the second mounting step S5, the plurality of glass fibers 20 protruding to the outside from the first optical fiber holding member 3A in the Z-axis direction are mounted on the second optical fiber holding member 6A. Thereafter, in the second bonding step S6, the plurality of glass fibers 20 are bonded to the second optical fiber holding member 6A using the ultraviolet curable resin. As illustrated in FIG. 12, a part of the second lid portion 8A is mounted on the first board 4 with the glass fibers 20 interposed therebetween, and the remaining part of the second lid portion 8A is mounted on the second board 7 with the glass fibers 20 interposed therebetween. Next, in a state where each glass fiber 20 is fixed by the second lid portion 8A and the second board 7, the ultraviolet curable resin is introduced into a gap between the second board 7 and the second lid portion 8A and a gap between the first board 4 and the second lid portion 8A.

The ultraviolet curable resin may be poured into the gap between the second lid portion 8A and the second board 7 and the gap between the second lid portion 8A and the first board 4 from the end face 22 side of each glass fiber 20. Thereafter, the ultraviolet curable resin is cured by irradiating the ultraviolet curable resin with ultraviolet light. In this way, the glass fibers 20 are bonded to each of the second board 7, the second lid portion 8A, and the first board 4 using the ultraviolet curable resin.

Thereafter, in the grinding step S7, the end face 22 of each glass fiber 20 and an end face of the second optical fiber holding member 6A are grinded. In this regard, the end face 22 of each glass fiber 20, the end face 72 of the second board 7, and an end face 82A of the second lid portion 8A are grinded so that the end face 22 of each glass fiber 20, the end face 72 of the second board 7, and the end face 82A of the second lid portion 8A are flush with each other.

As described above, in the method for manufacturing the optical fiber connection component 1A according to the second embodiment, since the second board 7 is fixed to the first board 4 via the second lid portion 8A, it is possible to indirectly fix the first optical fiber holding member 3A and the second optical fiber holding member 6A to each other without providing a step of directly bonding the first optical fiber holding member 3A and the second optical fiber holding member 6A.

(Modifications of First Optical Fiber Holding Member and Second Optical Fiber Holding Member)

Figure 13A:
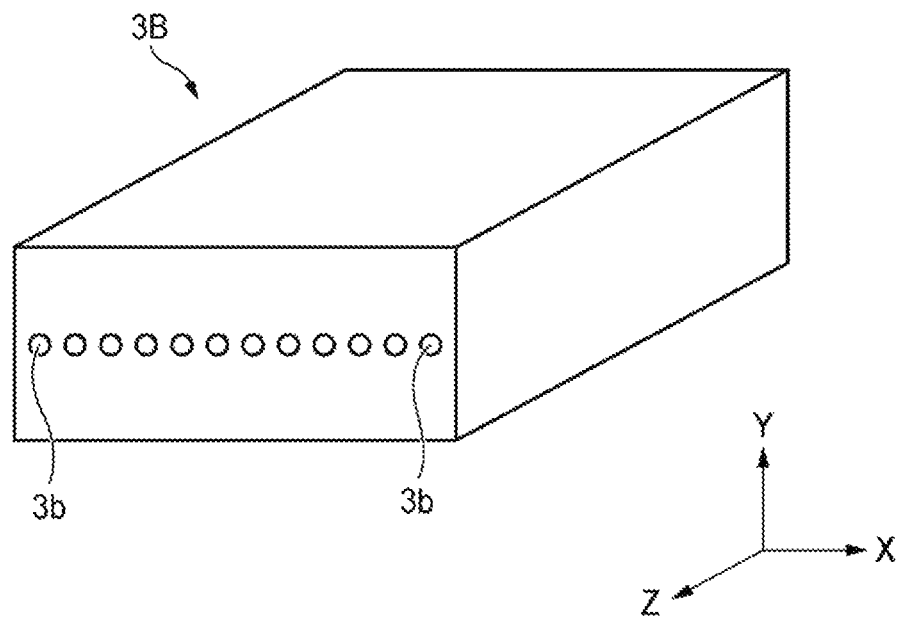
FIG. 13A is a diagram illustrating a first optical fiber holding member according to a modification.
Figure 13B:
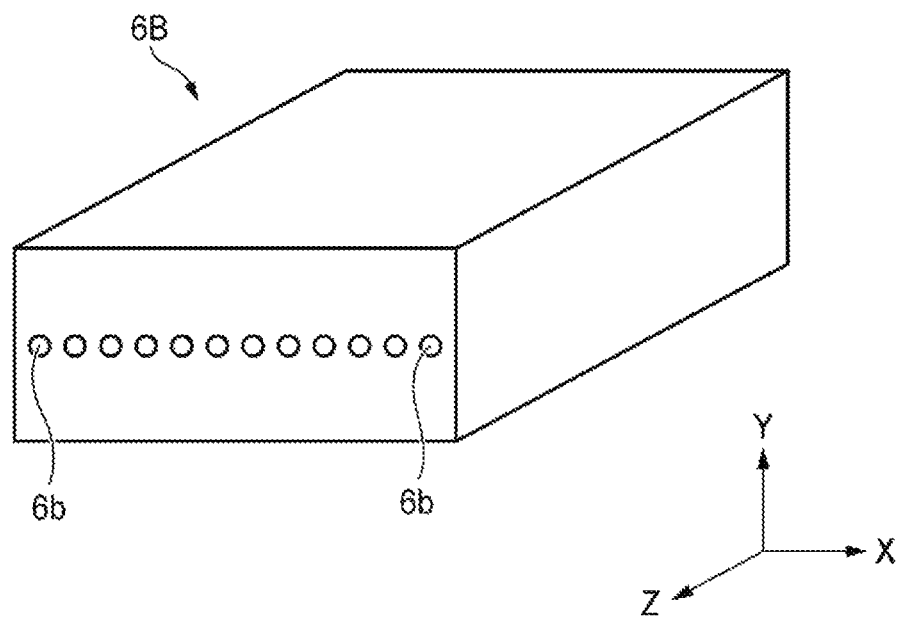
FIG. 13B is a diagram illustrating a second optical fiber holding member according to a modification.

FIG. 13A is a diagram illustrating a first optical fiber holding member 3B according to a modification. FIG. 13B is a diagram illustrating a second optical fiber holding member 6B according to a modification.

In place of the first optical fiber holding member 3 according to the first embodiment, the first optical fiber holding member 3B may be used in the optical fiber connection component 1. The first optical fiber holding member 3B is a first hole capillary having a plurality of first hole portions 3b arranged side by side in the X-axis direction. Each of the plurality of glass fibers 20 is inserted into a corresponding one of the plurality of first hole portions 3b. Thus, each of the plurality of first hole portions 3b holds a corresponding one of the plurality of glass fibers 20.

In place of the second optical fiber holding member 6 according to the first embodiment, the second optical fiber holding member 6B may be used in the optical fiber connection component 1. The second optical fiber holding member 6B is a second hole capillary having a plurality of second hole portions 6b arranged side by side in the X-axis direction. Each of the plurality of glass fibers 20 protruding from the first optical fiber holding member 3B in the Z-axis direction is inserted into a corresponding one of the plurality of second hole portions 6b. Thus, each of the plurality of second hole portions 6b holds a corresponding one of the plurality of glass fibers 20 protruding from the first optical fiber holding member 3B.

Next, a method for manufacturing the optical fiber connection component 1 in a case where the first optical fiber holding member 3B and the second optical fiber holding member 6B are applied to the optical fiber connection component 1 will be briefly described below with reference to FIG. 3.

In the first mounting step S2, each glass fiber 20 is inserted into a corresponding one of the plurality of first hole portions 3b so that the optical fibers 2 are mounted on the first optical fiber holding member 3B. Next, after the rotational alignment of the optical fibers 2 is performed, each glass fiber 20 is bonded to the first optical fiber holding member 3B using an ultraviolet curable resin (first bonding step S4).

In the second mounting step S5, each glass fiber 20 protruding from the first optical fiber holding member 3B is inserted into a corresponding one of the plurality of second hole portions 6b, so that the glass fibers 20 are mounted on the second optical fiber holding member 6B. Next, after each glass fiber 20 is bonded to the second optical fiber holding member 6B using an ultraviolet curable resin in the second bonding step S6, an end face of the second optical fiber holding member 6B and the end face 22 of each glass fiber 20 are grinded.

In this modification, similarly, since the grinding amount of each glass fiber 20 can be reduced, it is possible to prevent a situation in which a rotational position of a core of the optical fiber connection component 1 manufactured after the grinding step of the glass fiber 20 deviates from a desired rotational position obtained by adjustment in the rotational alignment step. As described above, it is possible to provide a method for manufacturing the optical fiber connection component 1 capable of improving optical characteristics of the optical fiber connection component 1.

Although the embodiments have been described above, it goes without saying that the technical scope of the present invention should not be construed as being limited by the description of the embodiments. It is to be understood by those skilled in the art that the embodiments are merely examples, and various modifications can be made within the scope of the inventions described in the claims. As described above, the technical scope of the present invention should be determined based on the scope of the inventions described in the claims and an equivalent scope thereof.

Figure 14:
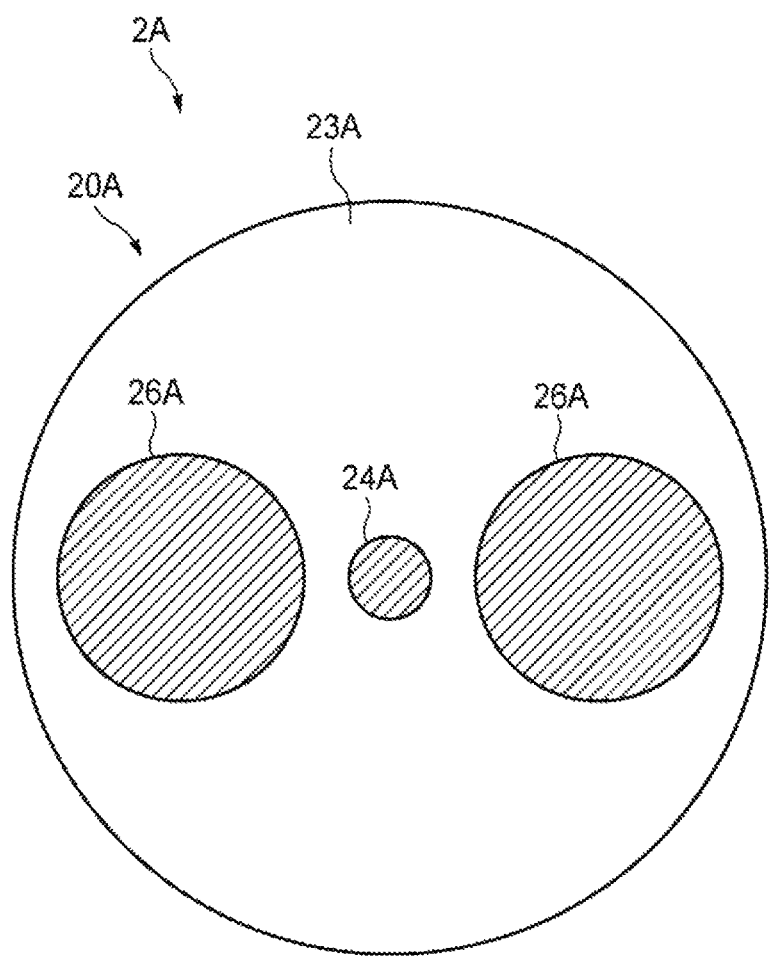
FIG. 14 is a cross-sectional view illustrating an example of a glass fiber of a polarization maintaining fiber.

Although the optical fiber is a multi-core fiber having a plurality of cores in the present disclosure, the optical fiber is not limited to a multi-core fiber. In this regard, the structure of the optical fiber is not particularly limited as long as the optical fiber has a structure in which the glass fiber of the optical fiber is not axis-symmetric with respect to a central axis thereof. For example, as illustrated in FIG. 14, instead of the optical fiber 2, a polarization maintaining fiber 2A may be applied to the optical fiber connection component 1. In this regard, the polarization maintaining fiber 2A includes a glass fiber 20A and a resin coating portion (not shown) that coats the glass fiber 20A. The glass fiber 20A may include a pair of stress applying portions 26A, a core 24A that is disposed between the pair of stress applying portions 26A and through which signal light propagates, and a cladding 23A that covers the pair of stress applying portions 26A and the core 24A. When the polarization maintaining fiber 2A is applied to the optical fiber connection component in place of the optical fiber 2, it is possible to provide an optical fiber connection component capable of connecting the polarization maintaining fiber with low crosstalk.

Although the plurality of optical fibers are a plurality of optical fibers that are not bonded to each other in the present disclosure, the present invention is not limited thereto. For example, as illustrated in FIG. 15, instead of the optical fiber 2, a plurality of optical fibers 2B included in an intermittent bonded-type fiber ribbon 120 may be applied to the optical fiber connection component 1. In the intermittent bonded-type fiber ribbon 120, a non-bonded region 122, which is a region where adjacent optical fibers 2B are not bonded, is intermittently provided along the Z-axis direction. When the optical fibers 2B included in the intermittent bonded-type fiber ribbon 120 are to be applied to the optical fiber connection component 1, the optical fibers 2B can be easily separated from each other before the optical fibers 2B are mounted on the first optical fiber holding member.

In addition, the intermittent bonded-type fiber ribbon may be an intermittent bonded-type fiber ribbon in which a complete separation region, in which the optical fibers are completely separated from each other, and a bonded region, in which the optical fibers are bonded to each other, are alternately provided in the Z-axis direction (longitudinal direction). In this case, it is not necessary to separately provide a step of separating the optical fibers before the step of mounting the optical fibers on the first optical fiber holding member.

In the description of the present disclosure, as long as the first optical fiber holding member and the second optical fiber holding member are able to hold an optical fiber, structures thereof are not particularly limited. For example, the first optical fiber holding member and the second optical fiber holding member may be cylindrical ferrules or MT ferrules.

REFERENCE SIGNS LIST 1, 1A: optical fiber connection component
2, 2A, 2B: optical fiber
A, 3A, 3B: first optical fiber holding member
3b: first hole portion
4: first board
5, 5A: first lid portion
6, 6A, 6B: second optical fiber holding member
6b: second hole portion
7: second board
8, 8A: second lid portion
10: first bonding agent
12: second bonding agent
20, 20A: glass fiber
21: resin coating portion
22: end face
23, 23A: cladding
24, 24A: core
25: marker
26A: stress applying portion
43, 44: holding region
46: first groove portion
76: second groove portion
120: intermittent bonded-type fiber ribbon
122: non-bonded region

The invention claimed is:

1. A method for manufacturing an optical fiber connection component, comprising:
preparing one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis;
mounting the one or the plurality of optical fibers on a first optical fiber holding member so that one or a plurality of glass fibers exposed from the resin coating portion are arranged side by side in a first direction and protrude to an outside from the first optical fiber holding member;
adjusting an azimuth around a central axis for the one or the plurality of optical fibers;
bonding the one or the plurality of glass fibers to the first optical fiber holding member using a first bonding agent;
mounting the one or the plurality of glass fibers on a second optical fiber holding member so that one or a plurality of glass fibers protruding to the outside from the first optical fiber holding member are arranged side by side in the first direction;
bonding the one or the plurality of glass fibers to the second optical fiber holding member using a second bonding agent; and
grinding an end face of the one or the plurality of glass fibers and an end face of the second optical fiber holding member so that the end face of the one or the plurality of glass fibers is flush with the end face of the second optical fiber holding member.

2. The method for manufacturing the optical fiber connection component according to claim 1, further comprising:
bonding the first optical fiber holding member and the second optical fiber holding member to each other.

3. The method for manufacturing the optical fiber connection component according to claim 1,
wherein the first optical fiber holding member includes a first board that has one or a plurality of first groove portions each of which holds a corresponding one of the one or the plurality of glass fibers, and a first lid portion that faces the first board with the one or the plurality of glass fibers interposed therebetween,
wherein the second optical fiber holding member includes a second board that has one or a plurality of second groove portions each of which holds a corresponding one of the one or the plurality of glass fibers, and a second lid portion that faces the second board with the one or the plurality of glass fibers interposed therebetween,
wherein the mounting of the one or the plurality of optical fibers on a first optical fiber holding member includes mounting the one or the plurality of optical fibers on the first board so that each of one or a plurality of glass fibers exposed from the resin coating portion is held in a corresponding one of the one or the plurality of first groove portions and protrudes to an outside from the first board,
wherein the bonding of the one or the plurality of glass fibers to the first optical fiber holding member includes providing the first bonding agent in the one or the plurality of first groove portions so that the one or the plurality of glass fibers are bonded to the first board and the first lid portion,
wherein the mounting the one or the plurality of glass fibers on a second optical fiber holding member includes mounting the one or the plurality of glass fibers on the second board so that each of one or a plurality of glass fibers protruding to the outside from the first board is held in a corresponding one of the one or the plurality of second groove portions,
wherein the bonding the one or the plurality of glass fibers to the second optical fiber holding member includes providing the second bonding agent in the one or the plurality of second groove portions so that the one or the plurality of glass fibers are bonded to the second board and the second lid portion, and
wherein the grinding the end face of the one or the plurality of glass fibers and the end face of the second optical fiber holding member includes grinding an end face of the one or the plurality of glass fibers, an end face of the second board, and an end face of the second lid portion so that the end face of the one or the plurality of glass fibers is flush with the end face of the second board and the end face of the second lid portion.

4. The method for manufacturing the optical fiber connection component according to claim 3,
wherein the second lid portion faces the first board and the second board, and
wherein in the second bonding the one or the plurality of glass fibers to the second optical fiber holding member, the second bonding agent is provided between the first board and the second lid portion so that the second board is fixed to the first board via the second lid portion.

5. The method for manufacturing the optical fiber connection component according to claim 1, wherein the first optical fiber holding member includes a first hole capillary having one or a plurality of first hole portions each of which holds a corresponding one of the one or the plurality of glass fibers, and wherein the second optical fiber holding member includes a second hole capillary having one or a plurality of second hole portions each of which holds a corresponding one of the one or the plurality of glass fibers.

6. The method for manufacturing the optical fiber connection component according to claims 1, wherein the one or the plurality of optical fibers are a plurality of optical fibers included in an intermittent bonded-type fiber ribbon.

7. The method for manufacturing the optical fiber connection component according to claims 1, wherein the one or the plurality of optical fibers are a plurality of optical fibers that are not bonded to each other.

8. The method for manufacturing the optical fiber connection component according to claims 1, wherein each of the one or the plurality of optical fibers is a multi-core fiber having a plurality of cores.

9. The method for manufacturing the optical fiber connection component according to claims 1, wherein each of the one or the plurality of optical fibers is a polarization maintaining fiber.

10. An optical fiber connection component, comprising:

one or a plurality of optical fibers each of which includes a glass fiber and a resin coating portion covering the glass fiber and in each of which an end portion of the glass fiber is exposed from the resin coating portion, the glass fiber including a core and a cladding that covers the core, and the glass fiber having a structure that is not axially symmetric with respect to a central axis of the glass fiber in a cross section perpendicular to the central axis;

a first optical fiber holding member holding the one or the plurality of glass fibers so that one or a plurality of glass fibers exposed from the resin coating portion are arranged side by side in a first direction; and a second optical fiber holding member holding the one or the plurality of glass fibers so that the one or the plurality of glass fibers protruding from the first optical fiber holding member are arranged side by side in the first direction, wherein an end face of the second optical fiber holding member is flush with an end face of the one or the plurality of glass fibers.

11. The optical fiber connection component according to claim 10, wherein the first optical fiber holding member is fixed to the second optical fiber holding member by a bonding agent.

12. The optical fiber connection component according to claim 10, wherein the first optical fiber holding member includes a first board that has one or a plurality of first groove portions each of which holds a corresponding one of the one or the plurality of glass fibers, and a first lid portion that faces the first board with the one or the plurality of glass fibers interposed therebetween, and wherein the second optical fiber holding member includes a second board that has one or a plurality of second groove portions each of which holds a corresponding one of the one or the plurality of glass fibers, and a second lid portion that faces the second board with the one or the plurality of glass fibers interposed therebetween.

13. The optical fiber connection component according to claim 12, wherein the one or the plurality of optical fibers are a plurality of optical fibers, wherein the one or the plurality of first groove portions are a plurality of first groove portions that are arranged in parallel to each other and each of which holds a corresponding one of a plurality of glass fibers exposed at respective end portions of the plurality of optical fibers, and wherein the one or the plurality of second groove portions are a plurality of second groove portions that are arranged in parallel to each other and each of which holds a corresponding one of the plurality of glass fibers.

14. The optical fiber connection component according to claim 12, wherein the second lid portion faces the first board and the second board, and wherein the second board is fixed to the first board via the second lid portion.

15. The optical fiber connection component according to claim 10, wherein the first optical fiber holding member includes a first hole capillary having one or a plurality of first hole portions each of which holds a corresponding one of the one or the plurality of glass fibers, and wherein the second optical fiber holding member includes a second hole capillary having one or a plurality of second hole portions each of which holds a corresponding one of the one or the plurality of glass fibers.

16. The optical fiber connection component according to claim 15, wherein the one or the plurality of optical fibers are a plurality of optical fibers, wherein the one or the plurality of first hole portions are a plurality of first hole portions that are arranged in parallel to each other and each of which holds a corresponding one of a plurality of glass fibers exposed at respective end portions of the plurality of optical fibers, and wherein the one or the plurality of second hole portions are a plurality of second hole portions that are arranged in parallel to each other and each of which holds a corresponding one of the plurality of glass fibers.

\* \* \* \* \*